Sept. 6, 1927.
J. H. OVERTON
1,641,778
SPRAYING DEVICE
Filed May 1, 1925
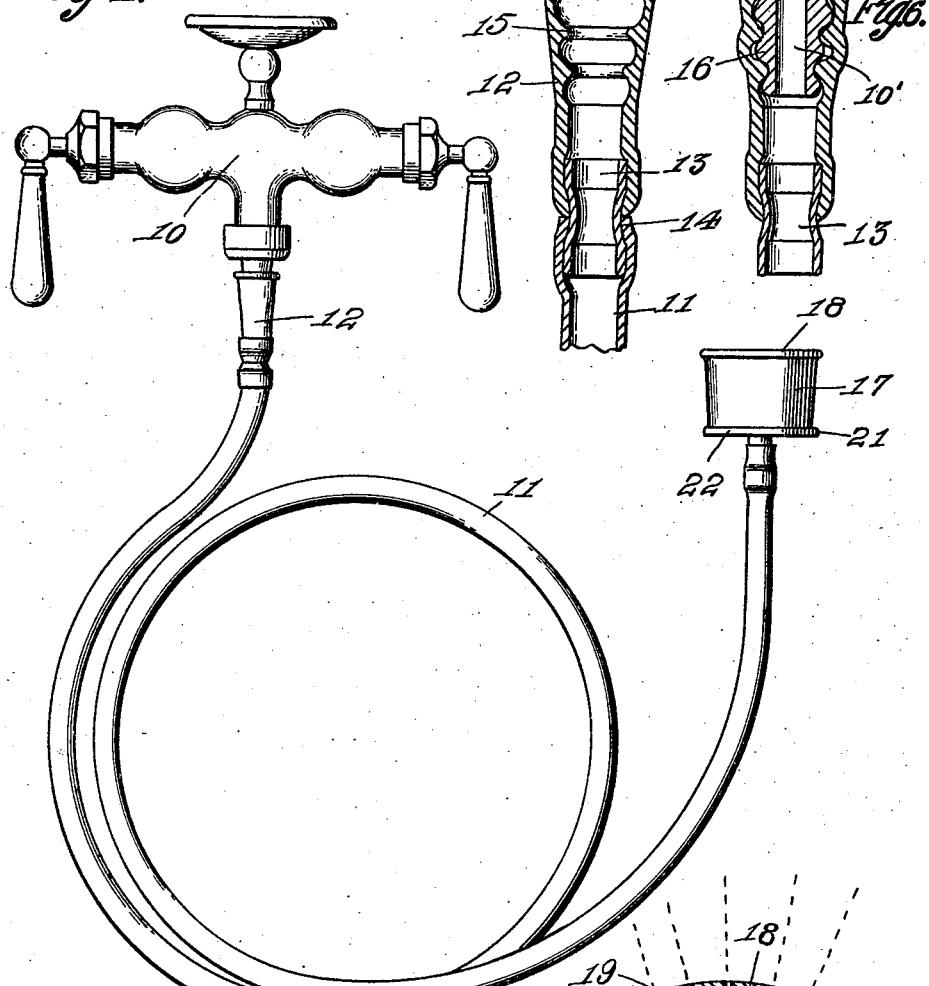
John H. Overton
INVENTOR
BY Victor J. Evans
ATTORNEY
WITNESS:

Patented Sept. 6, 1927.

1,641,778

UNITED STATES PATENT OFFICE.

JOHN H. OVERTON, OF TRENTON, NEW JERSEY.

SPRAYING DEVICE.

Application filed May 1, 1925. Serial No. 27,239.

This invention relates to spraying devices of the type adapted for detachable connection with a spigot and ordinarily used for shower baths.

An object of the present invention is to provide a spraying device of this character which includes a novel form of spray head in which the area of distribution of water passing from the head will be materially increased without increasing the size of the head.

Another object of the invention is to provide simple and efficient means for securing a head to a hose.

With the above and other objects in view, the invention further includes the following novel features and details of construction, to be hereinafter more fully described, illustrated in the accompanying drawings and pointed out in the appended claim.

In the drawings:—

Figure 1 is an elevation showing a faucet with the invention applied.

Figure 2 is an enlarged sectional view through the spray head with the latter in its normal condition.

Figure 3 is a similar view showing the shape of the head when in use.

Figure 4 is a face view of the outer end of the head.

Figure 5 is an enlarged sectional view of the faucet engaging nipple.

Figure 6 is a view showing the nipple attached to a faucet.

Referring to the drawings in detail wherein like characters of reference denote corresponding parts, the invention while shown attached to a combined hot and cold water faucet 10, may be attached to faucets of different types. For this purpose, the rubber hose 11 carries at one end a nipple 12, the latter being formed of flexible material such as rubber and being connected to one end of the hose 11 by means of a sleeve 13. This sleeve is provided with a reduced central portion forming an annular depression 14 which receives the end of the nipple and the adjacent end of the hose 11.

The nipple is outwardly flared and has extending from its inner wall, spaced annular flexible ribs 15 which are adapted to frictionally engage and grip the discharge end 10' of the faucet 10. The discharge end 10' of the faucet is shown as being provided with annular ribs 16 between which the ribs 15 are received and by forming the nipple 12 of flexible material, the ribs 15 and 16 may properly engage so as to hold the nipple in place. While the nipple is shown as engaged over a ribbed faucet, the ribs 15 will also grip and frictionally engage the faucet having a smooth discharge end.

The spray head which is indicated at 17 is formed of rubber or other suitable flexible material and its outer wall 18 is substantially flat. This wall is provided with discharge openings 19 which extend therethrough substantially at right angles to the wall. The inner end of the spray nozzle 17 is provided with an annular flange 20 which extends inward and which is received within a seat formed by a marginal flange 21 which extends around a plate 22. This plate is provided with an opening to receive the reduced threaded end 23 of a sleeve or nipple 24 so that a shoulder 25 is provided against which the plate 20 bears. Threadedly engaging the reduced end 23 of the nipple 24 is a plate 26, which bears against the opposite or inner face of the annular flange 20 and serves to provide a clamping engagement between the sleeve or nipple 24 and the spray head. These parts can easily be assembled as the plate 26 is forced into the open end of the resilient body 17 and manipulated until it rests against the flange 20 of said body. Then the plate 22 is placed against the flange 20 and finally the threaded end of the nipple 24 is passed through the hole in plate 22 and threaded into the hole of plate 26, pressure being exerted against the walls of the body 17 to press them against the plate 26 to prevent rotary movement of said plate when the nipple is being threaded into the same.

Pressure of water passing into the head 17 will flex the wall 18 outward so as to provide a concavo-convex outer end for the spray head and water passing through the openings 19 will be directed outwardly in such manner as to increase the area of distribution of the water so that a head of relatively small size may be utilized, the direction of the flow of water being illustrated by the dotted lines in Figure 3.

The invention is susceptible of various changes in its form, proportions and minor details of construction and the right is herein reserved to make such changes as properly fall within the scope of the appended claim.

Having described the invention what is claimed is:—

A spraying device comprising a spray head of substantially cylindrical contour and open at its bottom, said head being formed of flexible material and having a flat outer perforated wall adapted to be flexed outwardly by pressure within the head to increase the area of distribution of water passing through the perforations, a plate closing the open end of said head, and having a marginal flange bearing against the outer side of the head, said plate having a central opening therein adapted to receive a shouldered sleeve, the lower end of said head being extended inwardly to provide an annular flange reposing on said plate, and a second plate arranged within the head and threaded on said sleeve, and impinging said flange of the head therebetween and the first mentioned plate.

In testimony whereof I affix my signature.

JOHN H. OVERTON.